U S010737678B2

(12) United States Patent
Terai (10) Patent No.: US 10,737,678 B2
(45) Date of Patent: Aug. 11, 2020

(54) CONTROL APPARATUS OF TRANSMISSION AND METHOD OF CONTROLLING TRANSMISSION

(71) Applicant: SUBARU CORPORATION, Tokyo (JP)

(72) Inventor: Koichiro Terai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 5 days.

(21) Appl. No.: 16/242,051

(22) Filed: Jan. 8, 2019

(65) Prior Publication Data

US 2019/0275998 A1    Sep. 12, 2019

(30) Foreign Application Priority Data

Mar. 7, 2018    (JP) .................................. 2018-040918

(51) Int. Cl.
| | |
|---|---|
| *B60W 10/06* | (2006.01) |
| *F16H 61/662* | (2006.01) |
| *F16H 61/02* | (2006.01) |
| *F16H 61/12* | (2010.01) |
| *F16H 61/00* | (2006.01) |

(52) U.S. Cl.
CPC ......... *B60W 10/06* (2013.01); *F16H 61/0028* (2013.01); *F16H 61/0206* (2013.01); *F16H 61/12* (2013.01); *F16H 61/66263* (2013.01); *F16H 2061/1288* (2013.01)

(58) Field of Classification Search
None
See application file for complete search history.

(56) References Cited

U.S. PATENT DOCUMENTS

| | | | | |
|---|---|---|---|---|
| 5,155,996 | A * | 10/1992 | Tatsumi | ................ E02F 9/2235 60/431 |
| 7,192,383 | B2 * | 3/2007 | Shimada | ............... B60W 10/06 477/110 |
| 2019/0359206 | A1 * | 11/2019 | Hanslik | ............... B60W 10/184 |

FOREIGN PATENT DOCUMENTS

| | | |
|---|---|---|
| JP | 2012-112372 A | 6/2012 |
| JP | 2013-96540 A | 5/2013 |

(Continued)

OTHER PUBLICATIONS

Notification of reason(s) for refusal issued in corresponding Japanese Patent Application No. 2018-040918 dated Jun. 25, 2019 with machine translation.

*Primary Examiner* — Dirk Wright
(74) *Attorney, Agent, or Firm* — Troutman Sanders LLP (57) ABSTRACT

A control apparatus of a transmission includes the transmission that is configured to perform shifting operation with use of a control pressure derived from an actuating oil to be supplied to a hydraulic pressure unit. The control apparatus includes a hydraulic pressure supply source, a switcher, a control pressure adjusting valve, an abnormality detector, and a controller. The controller is configured to control the shifting operation of the transmission to keep a revolution speed of an engine, in an abnormal period in which an abnormality of the switcher is detected by the abnormality detector, at a value that is equal to or greater than an abnormal lower limit value. The abnormal lower limit value is higher than a normal lower limit value in a normal period. The normal period is prior to the detection of abnormality of the switcher by the abnormality detector.

19 Claims, 6 Drawing Sheets

(56) References Cited

FOREIGN PATENT DOCUMENTS

JP     2014-234909 A    12/2014
JP     2016-183579 A    10/2016

\* cited by examiner

CONTROL APPARATUS OF TRANSMISSION AND METHOD OF CONTROLLING TRANSMISSION

CROSS-REFERENCE TO RELATED APPLICATIONS

The present application claims priority from Japanese Patent Application No. 2018-040918 filed on Mar. 7, 2018, the entire contents of which are hereby incorporated by reference.

BACKGROUND

The technology relates to a control apparatus of a transmission to be mounted in a power feeding system of a structure such as a vehicle, and a method of controlling the transmission.

In a transmission to be mounted in a structure such as a vehicle, shifting operation is performed by means of a hydraulic pressure derived from an actuating oil. An oil pump discharges the actuating oil with use of engine power. The Applicant has proposed, for example, a discharge amount switching apparatus of an oil pump as disclosed in Japanese Unexamined Patent Application Publication No, 2016-183579. The discharge amount switching apparatus selectively switches discharging states of an oil.

SUMMARY

An aspect of the technology provides a control apparatus of a transmission. The transmission includes a hydraulic pressure unit and is configured to perform shifting operation with use of a control pressure derived from an actuating oil that is to be supplied to the hydraulic pressure unit. The control apparatus is configured to control the transmission. The control apparatus includes: a hydraulic pressure supply source including a plurality of discharge ports that are configured to discharge the actuating oil, in which the hydraulic pressure supply source has a discharge rate of the actuating oil discharged from the plurality of discharge ports, in which the discharge rate varies in accordance with a variation in a revolution speed of an engine that is coupled to the transmission; a switcher configured to switch between a full discharge state and a partial discharge state, in which the full discharge state is a state in which the actuating oil that is discharged from all of the plurality of discharge ports is supplied to the hydraulic pressure unit, and the partial discharge state is a state in which only the actuating oil that is discharged from one or more of the plurality of discharge ports is supplied to the hydraulic pressure unit; a control pressure adjusting valve configured to adjust the control pressure that is derived from the actuating oil and that is to be applied to the hydraulic pressure unit; an abnormality detector configured to detect an abnormality of the switcher; and a controller configured to control the shifting operation of the transmission to keep the revolution speed of the engine, in an abnormal period in which an abnormality of the switcher is detected by the abnormality detector, at a value that is equal to or greater than an abnormal lower limit value, in which the abnormal lower limit value is higher than a normal lower limit value in a normal period and the normal period is prior to the detection of the abnormality of the switcher by the abnormality detector.

An aspect of the technology provides a method of controlling a transmission. The transmission includes a hydraulic pressure unit and is configured to perform shifting operation with use of a control pressure derived from an actuating oil that is to be supplied to the hydraulic pressure unit. The method includes: switching between a full discharge state and a partial discharge state in a hydraulic pressure supply source, in which the hydraulic pressure supply source includes a plurality of discharge ports that are configured to discharge the actuating oil and has a discharge rate of the actuating oil that is discharged from the plurality of discharge ports, in which the discharge rate varies in accordance with a variation in a revolution speed of an engine that is coupled to the transmission, in which the full discharge state is a state in which the actuating oil that is discharged from all of the plurality of discharge ports is supplied to the hydraulic pressure unit, and the partial discharge state is a state in which only the actuating oil that is discharged from one or more of the plurality of discharge ports is supplied to the hydraulic pressure unit; adjusting the control pressure that is derived from the actuating oil and that is to be applied to the hydraulic pressure unit; detecting an abnormality of the switching; and controlling the shifting operation of the transmission to keep the revolution speed of the engine, in an abnormal period in which an abnormality of the switching is detected, at a value that is equal to or greater than an abnormal lower limit value, in which the abnormal lower limit value is higher than a normal lower limit value in a normal period and the normal period is prior to the detection of the abnormality of the switching.

DETAILED DESCRIPTION

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

There is room for improvement in terms of smoothly performing desired shifting operation even when a switching apparatus is used which switches discharging states of an actuating oil that is supplied to a transmission.

It is desirable to provide a control apparatus of a transmission and a method of controlling the transmission that make it possible to smoothly perform desired shifting operation.

It is to be noted that the descriptions will be provided in the following order.
1. Implementation (an example of a control apparatus of a continuously variable transmission configured to keep a revolution speed of an engine at a value that is equal to or greater than an abnormal lower limit value that is higher than a normal lower limit value in an abnormal period of a discharge rate)
2. Modification Examples 1. Implementation

[Schematic Configuration of Vehicle 1]

Figure 1:
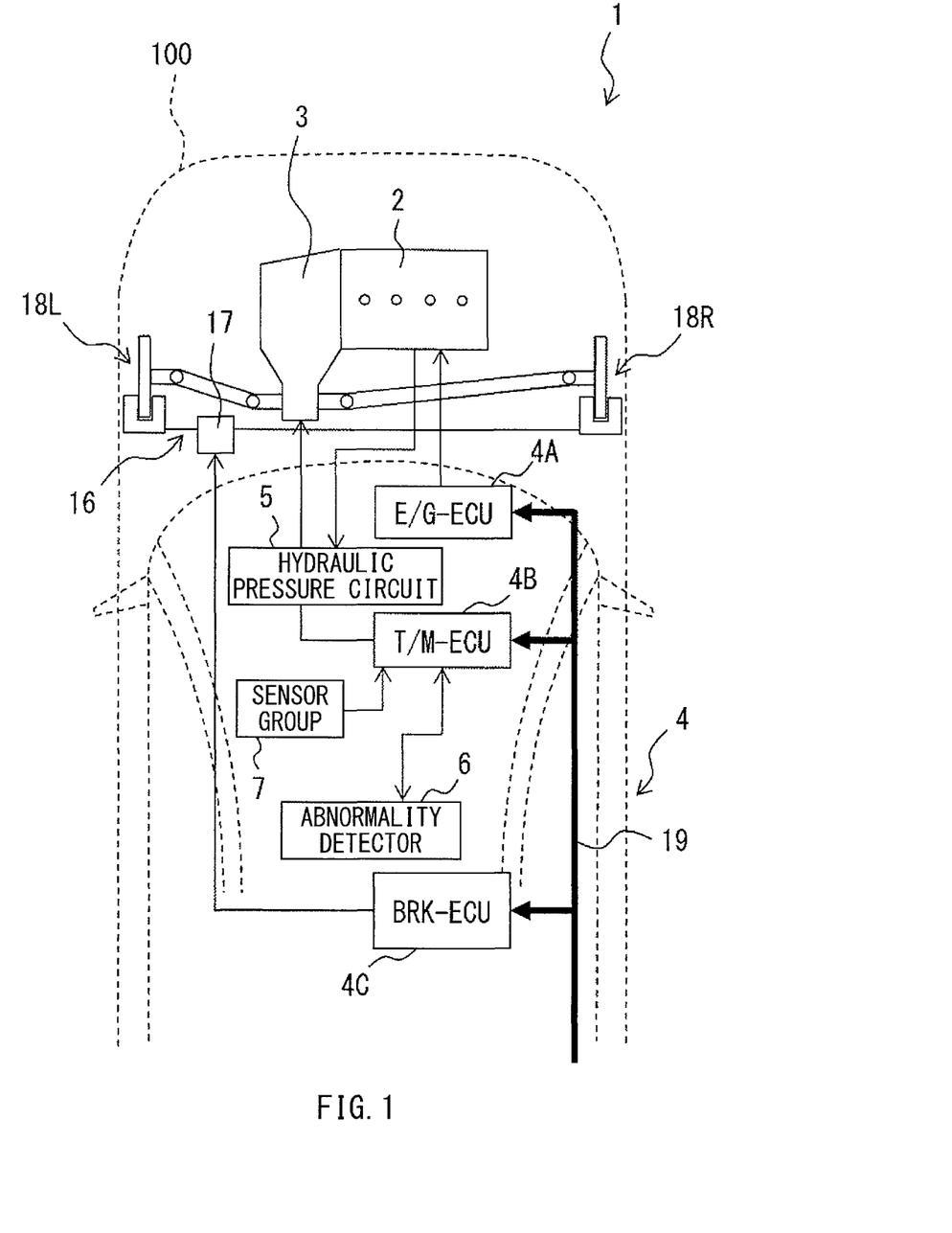
FIG. 1 is a schematic diagram illustrating a general configuration example of a vehicle including a continuously variable transmission and a control apparatus of the continuously variable transmission according to one implementation of the technology.
Figure 2:
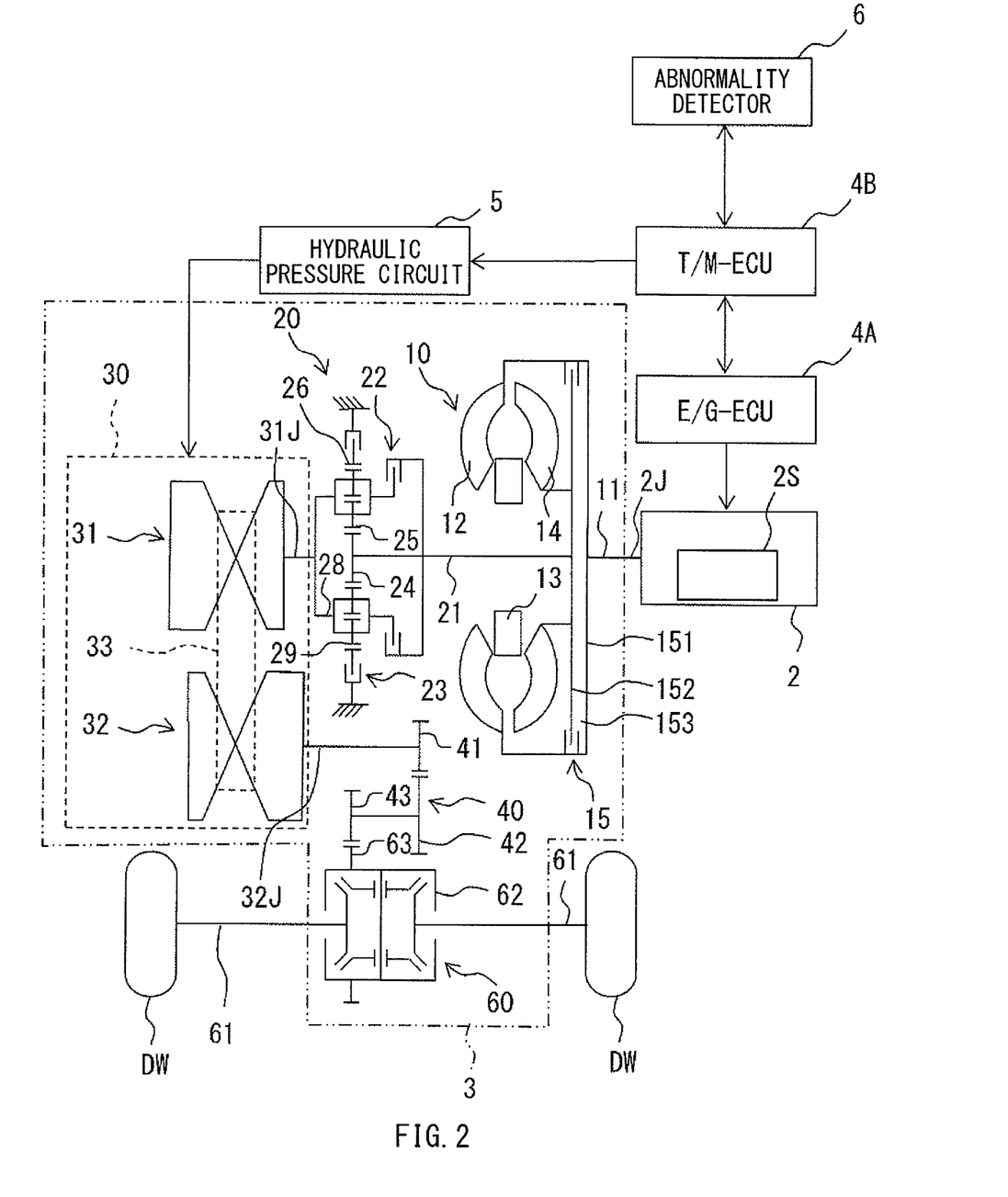
FIG. 2 is a schematic diagram illustrating a detailed configuration example of the continuously variable transmission illustrated in FIG. 1.
Figure 3:
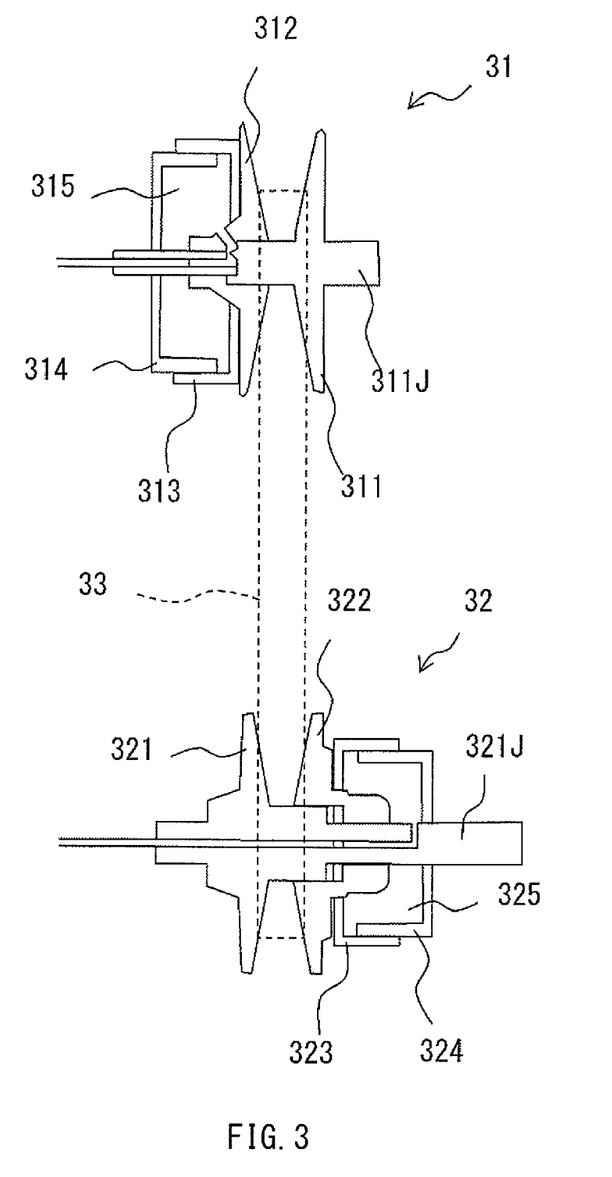
FIG. 3 is a schematic diagram illustrating an enlarged main part of a continuously variable transmission unit illustrated in FIG. 2.
Figure 4:
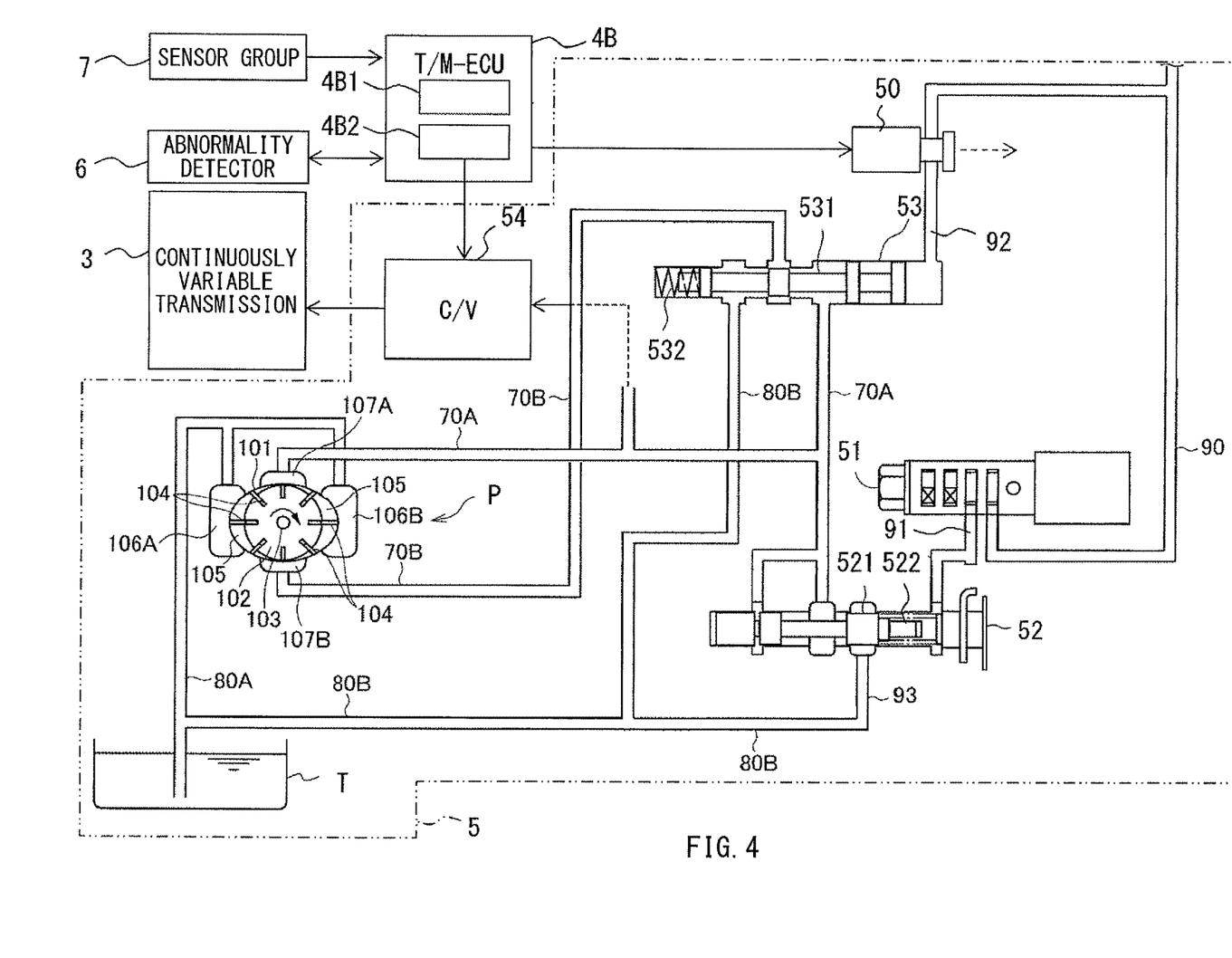
FIG. 4 is a schematic diagram illustrating a detailed configuration example of a hydraulic pressure circuit illustrated in FIG. 1.

FIG. 1 schematically illustrates a general configuration example of a vehicle 1 incorporating a continuously variable transmission 3 according to an example implementation of the technology. FIG. 2 is a schematic diagram illustrating a detailed configuration example of the continuously variable transmission 3 illustrated in FIG. 1. FIG. 3 illustrates an enlarged main part of a continuously variable transmission unit 30 illustrated in FIG. 2. The continuously variable transmission unit 30 will be described later. FIG. 4 is a schematic diagram illustrating a detailed configuration example of a hydraulic pressure circuit 4 illustrated in FIG. 1. A control apparatus of a transmission according to an example implementation of the technology may control shifting operation in the continuously variable transmission 3, and may be provided with components including an oil pump P, a switch control valve 53, a control valve unit 54, an abnormality detector 6, and a controller 4. These components will be each described later.

The vehicle 1 may be an automobile provided with, for example, four drive wheels DW as described later. Referring to FIG. 1, the vehicle 1 may be provided with a vehicle body 100. The vehicle 1 may include an engine 2, the continuously variable transmission 3, the controller 4, the hydraulic pressure circuit 5, the abnormality detector 6, and a sensor group 7. The engine 2 may be a power source. The continuously variable transmission 3 may feed, to the drive wheels DW, drive power derived from the engine 2. The vehicle 1 may further include a brake hydraulic system 16, a valve unit 17, and brakes 18L and 18R that are provided in the vehicle body 100. In one implementation, the continuously variable transmission 3 may serve as a "transmission". In one implementation, the controller 4 may serve as a "controller". In one implementation, the hydraulic pressure circuit 5 may serve as a "hydraulic pressure circuit". In one implementation, the abnormality detector 6 may serve as an "abnormality detector".

[Configuration of Engine 2]

The engine 2 may be an internal combustion engine that outputs mechanical energy (e.g., drive power) by combusting fuel such as gasoline. The engine 2 may be, for example, a piston reciprocating engine in which at least one piston moves backward and forward in a corresponding cylinder. The engine 2 may be provided with components including a fuel injection device, an ignition device, and a throttle valve 2S. The throttle valve 2S is illustrated in FIG. 2. The engine 2 may be controlled by an engine control unit (i.e., E/G-ECU) 4A in the controller 4. The drive power generated by the engine 2 may be outputted from an output shaft 2J illustrated in FIG. 2. The generated drive power may be inputted to the continuously variable transmission 3. The continuously variable transmission 3 may be coupled to the engine 2.

[Configuration of Continuously Variable Transmission 3]

Referring to FIG. 2, the continuously variable transmission 3 may include, for example, a torque converter 10, a forward reverse switching mechanism 20, the continuously variable transmission unit 30, and a deceleration unit 40, and a differential 60.

[Torque Converter 10]

The torque converter 10 may be, for example, a fluid feeding unit that feeds the drive power derived from the engine 2 to the forward reverse switching mechanism by means of an actuating oil. The forward reverse switching mechanism 20 may be located downstream of the torque converter 10. The actuating oil may include, for example, an automatic transmission fluid (ATF). The fluid feeding unit may increase torque of the drive power. Referring to FIG. 2, the torque converter 10 may include an input shaft 11, three types of impellers including a pump impeller 12, a stator 13, and a turbine runner 14, and a lockup clutch 15.

The pump impeller 12, the stator 13, and the turbine runner 14 may each revolve coaxially around the input shaft 11. The input shaft 11 may be provided on a predetermined location in the torque converter 10. The predetermined location in the torque converter 10 may face the engine 2. The input shaft 11 may be coupled to the output shaft 2J of the engine 2, causing the input shaft 11 and the output shaft 2J to integrally revolve. The pump impeller 12 may be coupled to the input shaft 11, causing the pump impeller 12 and the input shaft 11 to integrally revolve. In contrast, referring to FIG. 2, the turbine runner 14 may be coupled to an input shaft 21 of the forward reverse switching mechanism 20. The input shaft 21 will be described later. Further, the stator 13 may be engageable with a static member out of components configuring the continuously variable transmission 3. The static member may include, for example, a housing of the continuously variable transmission 3. Further, the pump impeller 12 and the turbine runner 14 may be sealed therebetween with the actuating oil.

The torque converter 10 may feed, to the turbine runner 14, the drive power that is derived from the engine 2 and is to be fed to the pump impeller 12. During the feeding, the torque converter 10 may increase the torque of the drive power by means of the actuating oil. The revolution of the pump impeller 12 cause the actuating oil to move from the pump impeller 12 to the turbine runner 14, following which the actuating oil may return to the pump impeller 12 again. At this occasion, in other words, upon the actuating oil that has moved to the turbine runner 14 returning from the turbine runner 14 to the pump impeller 12, the stator 13 may vary a flow direction of the actuating oil to a direction along the revolutions of the pump impeller 12 and the turbine runner 14. This makes it possible, in the torque converter 10, to increase the torque that is to be fed from the pump impeller 12 to the turbine runner 14.

The lockup clutch 15 may couple the pump impeller 12 and the turbine runner 14 to each other. In an example implementation, the lockup clutch 15 may include a revolution member 151 and a revolution member 152. The revolution member 151 may be coupled to the input shaft 11. The revolution member 152 may be coupled to the input shaft 21 of the forward reverse switching mechanism 20. The revolution member 151 and the revolution member 152 may be disposed to face each other. When the lockup clutch 15 is in a coupled state, the application of a hydraulic pressure derived from the actuating oil may cause the revolution member 151 and the revolution member 152 to be biased and brought into contact with each other by means of a predetermined clutch pressure, allowing for a synchronous revolution. An oil chamber 153 sealed with the actuating oil may be disposed between the revolution member 151 and the revolution member 152. At this occasion, the pump impeller 12 and the turbine runner 14 may become coupled directly to each other, causing the drive power derived from the engine 2 to be directly fed from the turbine runner 14 to the forward reverse switching mechanism 20. When the lockup clutch 15 is in the coupled state, the E/G-ECU 4A may keep output torque of the output shaft 2J to such a level that a slip occurring on a contact surface between the revolution member 151 and the revolution member 152 is avoided or suppressed, even when an error occurs. The error will be described later.

[Forward Reverse Switching Mechanism 20]

The forward reverse switching mechanism 20 may include a gear such as a double pinion planetary gear or a dual planetary gear. The forward reverse switching mechanism 20 may include, for example, the input shaft 21, a sun gear 24, an inner planetary pinion 25, an outer planetary pinion 26, a planetary carrier 28, and a ring gear 29. The input shaft 21 may be coupled to the turbine runner 14 of the torque converter 10. The sun gear 24 may be coupled to the input shaft 21. The sun gear 24 may be in mesh with the inner planetary pinion 25. The outer planetary pinion 26 may be in mesh with the inner planetary pinion 25. The planetary carrier 28 may rotatable support the inner planetary pinion 25 and the outer planetary pinion 26. The ring gear 29 may be in mesh with the outer planetary pinion 26. The planetary carrier 28 may be coupled to an input shaft 31J of the continuously variable transmission unit 30. The input shaft 31J of the continuously variable transmission unit 30 may be referred to as a transmission unit input shaft. The continuously variable transmission unit 30 will be described later.

The forward reverse switching mechanism 20 may further include a forward clutch 22 and a reverse brake 23. The forward clutch 22 may couple the sun gear 24 and the planetary carrier 28 to each other. The reverse brake 23 may control the revolution of the ring gear 29. In the forward reverse switching mechanism 20, the forward clutch 22 may be operated into a coupled state, and further, the reverse brake 23 may be operated into a released state. These two operations may cause all of the sun gear 24, the planetary carrier 28, and the ring gear 29 to integrally revolve. This enables the forward reverse switching mechanism 20 to feed, to the transmission unit input shaft 31J, the drive power that is derived from the engine 2 and thereafter received at the input shaft 21. The forward reverse switching mechanism 20 may perform this feeding of the drive power without causing the revolution direction and the revolution speed of the drive power to vary. In contrast, the forward clutch 22 may be operated into the released state, and further, the reverse brake 23 may be operated into a stopped state. These two operations may cause the planetary carrier 28 to revolve in the opposite direction to the revolution direction of the sun gear 24. This enables the forward reverse switching mechanism 20 to reverse the revolution direction of the drive power that is derived from the engine 2 and thereafter received at the input shaft 21, to thereby make it possible to feed the drive power to the transmission unit input shaft 31J. Further, both the forward clutch 22 and the reverse brake 23 may be operated into the released state. This may block the feeding of the drive power between the sun gear 24 and the planetary carrier 28. In an example implementation, the controller 4 may so cooperate with the forward reverse switching mechanism 20 as to control the states of the forward clutch 22 and the states of the reverse brake 23. The states of the forward clutch 22 may include, for example, the coupled state and the released state. The states of the reverse brake 23 may include, for example, the stopped state and a non-operating state.

[Continuously Variable Transmission Unit 30]

The continuously variable transmission unit 30 may be a CVT that makes it possible to continuously vary a shifting ratio. The continuously variable transmission unit 30 may include the transmission unit input shaft 31J, a primary pulley 31, a transmission unit output shaft 32J, a secondary pulley 32, and a chain 33. The transmission unit input shaft 31J may be coupled to the planetary carrier 28. The transmission unit input shaft 31J may receive the drive power derived from the output shaft 2J via the forward reverse switching mechanism 20. The primary pulley 31 may be provided coaxially with the transmission unit input shaft 31J. The primary pulley 31 may revolve synchronously with the transmission unit input shaft 31J by means of the drive power derived from the engine 2. The transmission unit output shaft 32J may be provided in parallel with the transmission unit input shaft 31J. The transmission unit output shaft 32J may be so provided as to be spaced with a predetermined interval from the transmission unit input shaft 31J. The transmission unit output shaft 32J may output the drive power to the deceleration unit 40. The secondary pulley 32 may be provided coaxially with the transmission unit output shaft 32J. The secondary pulley 32 may revolve synchronously with the transmission unit output shaft 32J. The chain 33 may be a power feeding member that is wound on both the primary pulley 31 and the secondary pulley 32. The chain 33 may feed the drive power derived from the transmission unit input shaft 31J to the transmission unit output shaft 32J. In an example implementation, a metal belt may be used for the power feeding member, in place of the chain 33.

The continuously variable transmission unit 30 may perform its operation when the hydraulic pressure is supplied from the hydraulic pressure circuit 5 to the continuously variable transmission unit 30. The continuously variable transmission unit 30 may vary a pulley width of the primary pulley 31, to thereby make it possible to vary a winding diameter of the chain 33 that is wound on the primary pulley 31. Further, the continuously variable transmission unit 30 may vary a pulley width of the secondary pulley 32, to thereby make it possible to vary the winding diameter of the chain 33 that is wound on the secondary pulley 32. Under the control performed by a transmission control unit (i.e., T/M-ECU) 4B, the continuously variable transmission unit 30 may vary the pulley width of the primary pulley 31, to thereby cause the winding diameter of the chain 33 on the primary pulley 31 to vary, and similarly, may vary the pulley width of the secondary pulley 32, to thereby cause the winding diameter of the chain 33 on the secondary pulley 32 to vary. The T/M-ECU 4B will be described later. The ratio of a winding diameter Ro of the chain 33 on the secondary pulley 32 to a winding diameter Ri of the chain 33 on the primary pulley 31 (Ro/Ri) may be a shifting ratio that is a ratio of the revolution speed Ni of the transmission unit input shaft 31J to the revolution speed No of the transmission unit output shaft 32J (Ni/No). The continuously variable transmission unit 30 may continuously vary at least one of the pulley width of the primary pulley 31 and the pulley width of the secondary pulley 32, to thereby make it possible to continuously vary the shifting ratio (Ni/No).

The continuously variable transmission unit 30 may vary the revolution speed based on the drive power (i.e., torque) received by the transmission unit input shaft 31J. This variation of the torque may be controlled by means of both the primary pulley 31 and the secondary pulley 32. The resultant drive power may be fed from the transmission unit output shaft 32J to the deceleration unit 40. The number of revolutions of the primary pulley 31 (i.e., the primary pulley revolution number) may be detected by a revolution number sensor of primary pulley. The number of revolutions of the secondary pulley 32 (i.e., the secondary pulley revolution number) may be detected by a revolution number sensor of secondary pulley. Both the number of revolutions of the primary pulley and the number of revolutions of the secondary pulley each detected by the corresponding sensor may be outputted to the transmission control unit (T/M-ECU) 4B.

Referring to FIG. 3, a detailed description will be given of the configuration of the primary pulley 31 and the configuration of the secondary pulley 32 in the continuously variable transmission unit 30.

As illustrated in FIG. 3, the primary pulley 31 may include a fixed sheave 311 and a movable sheave 312. The fixed sheave 311 may be integrally formed with a primary shaft 311J that is fixed to the transmission unit input shaft 31J. The movable sheave 312 may be so provided as to be movable toward the fixed sheave 311 along a direction in which the primary shaft 311J extends. The primary pulley 31 may include a plunger 314 that is coupled to the primary shaft 311J of the fixed sheave 311. The primary pulley 31 may also include a cylinder 313 that is coupled to the movable sheave 312. The cylinder 313 may be in slidable contact with an outer peripheral surface of the plunger 314. The primary pulley 31 may also include an oil chamber 315 that is disposed between the plunger 314 and the cylinder 313. The oil chamber 315 may be used for driving the movable sheave 312 in the axial direction of the primary shaft 311J by means of the hydraulic pressure.

In a similar manner to the primary pulley 31, the secondary pulley 32 may include a fixed sheave 321 and a movable sheave 322. The fixed sheave 321 may be integrally formed with a secondary shaft 321J that is fixed to the transmission unit output shaft 32J. The movable sheave 322 may be so provided as to be movable toward the fixed sheave 321 along a direction in which the secondary shaft 321J extends. The secondary pulley 32 may include a plunger 324 that is coupled to the secondary shaft 321J of the fixed sheave 321. The secondary pulley 32 may also include a cylinder 323 that is coupled to the movable sheave 322. The cylinder 323 may be in slidable contact with an outer peripheral surface of the plunger 324. The secondary pulley 32 may also include an oil chamber 325 that is disposed between the plunger 324 and the cylinder 323. The oil chamber 325 may be used for driving the movable sheave 322 in the axial direction of the secondary shaft 321J by means of the hydraulic pressure.

The oil chamber 315 of the primary pulley 31 and the oil chamber 325 of the secondary pulley 32 may be each supplied with the hydraulic pressure derived from the hydraulic pressure circuit 5. The primary pulley 31 may have a groove width that is determined on the basis of a hydraulic pressure to be supplied to the oil chamber 315 (hereinafter, referred to as a primary pressure). The secondary pulley 32 may have a groove width that is determined on the basis of a hydraulic pressure to be supplied to the oil chamber 325 (hereinafter, referred to as a secondary pressure). The hydraulic pressure circuit 5 may adjust both the primary pressure to be supplied to the oil chamber 315 and the secondary pressure to be supplied to the oil chamber 325. In other words, the primary pressure may be a hydraulic pressure that is supplied to the primary pulley 31 as a hydraulic pressure unit in the continuously variable transmission unit 30. Similarly, the secondary pressure may be a hydraulic pressure that is supplied to the secondary pulley 32 as the hydraulic pressure unit in the continuously variable transmission unit 30. The hydraulic pressures including, for example, the primary pressure and the secondary pressure may be each adjusted by the hydraulic pressure circuit 5 and each supplied to the corresponding hydraulic pressure unit. Such hydraulic pressures may be controlled by a control valve unit 54 in accordance with a driving state (e.g., a shifting ratio) of the vehicle 1. The control valve unit 54 will be described later.

[Deceleration Unit 40]

The deceleration unit 40 may include a drive gear 41, a driven gear 42, and a differential drive gear 43. The drive gear 41 may be coupled to the transmission unit output shaft 32J. The driven gear 42 may be in mesh with the drive gear 41. The differential drive gear 43 may be coupled to the driven gear 42. The differential drive gear 43 may be in mesh with a ring gear 63. The ring gear 63 may be fixed to a differential case 62 of the differential 60. The differential case 62 will be described later. The deceleration unit 40 may cause the vehicle 1 to decelerate, to thereby increase torque of the drive power derived from the transmission unit output shaft 32J. Thereafter, the deceleration unit 40 may feed the resultant drive power to the differential 60.

[Differential 60]

The differential 60 may distribute and feed the resultant drive power derived from the deceleration unit 40 to each of left and right drive shafts 61. Each of the left and right drive shafts 61 may be coupled to corresponding one of the drive wheels DW. The drive power outputted from the output shaft 2J of the engine 2 may be fed to the drive wheels DW via the continuously variable transmission 3. The drive power fed to the drive wheels DW causes friction force between the drive wheels DW and a road surface on which the vehicle 1 is running, a result of which driving force to cause the vehicle 1 to run is generated.

[Configuration of Hydraulic Pressure Circuit 5]

Referring to FIG. 4, the hydraulic pressure circuit 5 may include an oil tank T, an oil pump P, a switch pressure solenoid 50, a line pressure linear solenoid valve 51, a line pressure control valve 52, a switch control valve 53, and a control valve unit 54. The hydraulic pressure circuit 5 may further include a first line pressure oil path 70A, a second line pressure oil path 70B, a first suction oil path 80A, a second suction oil path 80B, a pilot pressure oil path 90, a first control pressure oil path 91, a second control pressure oil path 92, and a drain oil path 93.

The oil tank T may be, for example, a container storing an actuating oil that flows in the hydraulic pressure circuit 5. The oil pump P may serve as a hydraulic pressure supply source. In an example implementation, the oil pump P may be, for example, a two-port vane pump. The two-port vane pump may include two suction ports (e.g., inlet ports) and two discharge ports (e.g., outlet ports). The two suction ports may include a first suction port 106A and a second suction port 106B. The two discharge ports may include a first discharge port 107A and a second discharge port 1079. The oil pump P may suck an actuating oil stored in the oil tank T through the first suction oil path 80A by means of both the first suction port 106A and the second suction port 106B, following which the sucked actuating oil is pressurized. After the pressurization, the resultant actuating oil may be discharged from both the first discharge port 107A and the second discharge port 107B. A discharge rate of the actuating oil from each of the first discharge port 107A and the second discharge port 1079 may vary in accordance with a variation in the revolution speed of the output shaft 2J of the engine 2. In one implementation, the first discharge port 107A and the second discharge port 107B may serve as a "plurality of discharge ports".

The oil pump P may include a cam ring 101, a rotor 102, a pump shaft 103, and a plurality of vanes 104. The cam ring 101 may include, for example, a substantially elliptic inner face in a cross-sectional view. The rotor 102 may be disposed in the cam ring 101 and driven by drive power derived from the engine 2. The pump shaft 103 may rotatably support the rotor 102. The plurality of vanes 104 may be each built in corresponding one of grooves provided around the rotor 102. The grooves may extend in a radial direction of the rotor 102.

The plurality of vanes 104 may be so provided as to be movable in the radial direction of the rotor 102 along the corresponding one of the grooves of the rotor 102. The plurality of vanes 104 may have own tips. The tips may be each brought into contact with an inner peripheral surface of the cam ring 101 by centrifugal force when the rotor 102 revolves. The plurality of vanes 104 and the rotor 102 may revolve together while the tips of the plurality of vanes 104 are in contact with the inner peripheral surface of the cam ring 101. In other words, the revolution of the rotor 102 may cause the plurality of vanes 104 to be slid on the inner peripheral surface of the cam ring 101. The oil chamber 105 may have a predetermined volume that is defined by the corn ring 101, the rotor 102, and the plurality of vanes 104. The volume of the oil chamber 105 may vary when the rotor 102 revolves and thereby the plurality of vanes 104 may be slid on the inner peripheral surface of the cam ring 101. The variation of the volume of the oil chamber 105 allows for suction operation and discharge operation.

The revolution of the rotor 102 may cause the actuating oil to be sucked from the first suction port 106A through the first suction oil path 80A. The sucked actuating oil may be pressurized to increase the pressure. After the pressurization, the resultant actuating oil may be discharged from the first suction port 107A to the first line pressure oil path 704. Similarly, the actuating oil may be sucked from the second suction port 106B through the first suction oil path 80A. The sucked actuating oil may be pressurized to increase the pressure. After the pressurization, the resultant actuating oil may be discharged from the second discharge port 107B to the second line pressure oil path 70B.

The hydraulic pressure circuit 5 may be provided with the oil pump P including the first discharge port 107A and the second discharge port 107B. In such a hydraulic pressure circuit 5, it is possible to switch between a half discharge state and a full discharge state. The half discharge state may be, for example, a state in which only an actuating oil discharged from the first discharge port 107A is supplied to a predetermined supply destination. The predetermined supply destination may be, for example, the continuously variable transmission 3. In the half discharge state, an actuating oil discharged from the second discharge port 107B may be, for example, supplied, as a lubricating oil, to each section in the continuously variable transmission 3. Alternatively, the actuating oil may be returned to the oil tank T. In contrast, the full discharge state may be, for example, a state in which both the actuating oil discharged from the first discharge port 107A and the actuating oil discharged from the second discharge port 107B are merged together, and thereafter supplied to the continuously variable transmission 3. Accordingly, an operating state in the hydraulic pressure circuit 5 may be switched between the half discharge state and the full discharge state in accordance with a pressure requested in a supply destination (e.g., the continuously variable transmission 3). This makes it possible to reduce energy loss. In one implementation, the half discharge state may serve as a "partial discharge state".

In an example implementation described above, the first line pressure oil path 70A may be coupled to the first discharge port 107A of the oil pump P. Further, the second line pressure oil path 70B may be coupled to the second discharge port 107B of the oil pump P. The second line pressure oil path 70B may be in communication with the first line pressure oil path 70A via the switch control valve 53. The first line pressure oil path 70A may be provided with the line pressure control valve 52. The line pressure control valve 52 may so adjust a hydraulic pressure of an actuating oil discharged from the oil pump P as to be equivalent to a line pressure requested in the continuously variable transmission 3. The hydraulic pressure of the actuating oil discharged from the oil pump P may refer to a discharge pressure.

The line pressure control valve 52 may be coupled to each of the first control pressure oil path, the first line pressure oil path 70A, and the drain oil path 93. The first control pressure oil path 91 may be in communication with the line pressure linear solenoid valve 51. The drain oil path 93 may discharge an actuating oil to the oil tank T. The line pressure control valve 52 may include a spool 521 that slidably moves in an axial direction of the line pressure control valve 52. The line pressure control valve 52 may include a spring 522 provided at the end of the spool 521. The spool 521 may be moved in the axial direction of the line pressure control valve 52. This movement of the spool 521 may be on the basis of a predetermined balance of pieces of force including, for example, pressing force derived from a line pressure-controlling pressure, biasing force, and pressing force derived from an actual line pressure in the first line pressure oil path 70A. The pressing force derived from the line pressure-controlling pressure may be generated by the line pressure linear solenoid valve 51. The biasing force may be derived from the spring 522. The movement of the spool 521 in the axial direction allows an amount of the actuating oil that is discharged from the first line pressure oil path 70A to the drain oil path 93 to be adjusted. This leads to the adjustment of the line pressure.

The line pressure control valve 52 may cause the first line pressure oil path 70A and the drain oil path 93 to be in communication with each other when the pressing force derived from the actual line pressure is greater than the pressing force derived from the line pressure-controlling pressure. This allows the actuating oil of the first line pressure oil path 70A to be discharged through the drain oil path 93, a result of which a pressure derived from the actuating oil is so adjusted as to cause the actual line pressure to be the same as the line pressure-controlling pressure. In contrast, the line pressure control valve 52 may block the communication between the first line pressure oil path 70A and the drain oil path 93, to thereby prevent the actuating oil from being discharged from the first line pressure oil path 70A to the drain oil path 93 when the pressing force derived from the actual line pressure is smaller than the pressing force derived from the line pressure-controlling pressure.

The line pressure linear solenoid valve 51 may be a pressure reducing valve. The pressure reducing valve may adjust an actual line pressure in accordance with an electric current value that is applied from the T/M-ECU 4B. The electric current value may be applied from the T/M-ECU 4B on the basis of the line pressure requested in the continuously variable transmission 3. In other words, the line pressure linear solenoid valve 51 may adjust a pressure (e.g., a pilot pressure) that is supplied from the pilot pressure oil path 90 in accordance with the applied electric current, to thereby adjust the line pressure-controlling pressure. The actuating oil based on the adjusted line pressure-controlling pressure may be supplied to the line pressure control valve 52 through the first control pressure oil path 91, and thereby, the line pressure control valve 52 may be controlled to be driven. For example, as an electric current value to be applied to the line pressure linear solenoid valve 51 increases, the line pressure-controlling pressure may linearly increase, and in accordance with this linear increase, the actual line pressure may also linearly increase.

The second discharge port 107B of the oil pump P may be in communication with the first line pressure oil path 70A through the second line pressure oil path 70B and the switch control valve 53. The second discharge port 107B of the oil pump P may also be in communication with the first suction oil path 80A through the second line pressure oil path 70B, the switch control valve 53, and the second suction oil path 809.

The switch control valve 53 may include a spool 531 and a spring 532. The spool 531 may be movable in an axial direction of the switch control valve 53. The spring 532 may bias an end of the spool 531. The movement of the spool 531 may cause the switch control valve 53 to switch a discharging destination of an actuating oil between the first line pressure oil path 70A and the second suction oil path 80B. The actuating oil may be discharged from the second discharge port 107B. The second suction oil path 80B may be in communication with the second suction port 106B of the oil pump P. The switching of the discharging destination of the actuating oil may be performed on the basis of a difference among predetermined pieces of pressing force including, for example, pressing force derived from an actual line pressure of the first line pressure oil path 70A, pressing force derived from a line pressure-controlling pressure, and pressing force derived from a switch hydraulic pressure generated by the switch pressure solenoid 50. For example, the spool 531 may be moved in the switch control valve 53 when a switch hydraulic pressure is supplied from the switch pressure solenoid 50. This movement of the spool 531 allows the second line pressure oil path 70B and the second suction oil path 80B to be in communication with each other. In this state, the discharging destination of the actuating oil that is discharged from the second discharge port 107B may be the second suction oil path 80B. This state may correspond to the half discharge state. The switch hydraulic pressure may have, for example, a predetermined level of pressure. In contrast, the spool 531 may be so positioned in the switch control valve 53 as to allow the second line pressure oil path 70B and the first line pressure oil path 70A to be in communication with each other when the switch hydraulic pressure is not supplied from the switch pressure solenoid 50 (e.g., when the switch hydraulic pressure is zero). This state may correspond to the full discharge state. In one implementation, the switch control valve 53 may serve as a "switcher".

The switch pressure solenoid 50 may generate a switch hydraulic pressure. The switch hydraulic pressure allows for switching as to whether to fix the discharging destination of the actuating oil to the second suction oil path 80B (i.e., fixed to the half discharge state) on the basis of an operating state of the continuously variable transmission 3. The actuating oil may be discharged from the second discharge port 107B. The second suction oil path 80B may be in communication with both the first suction port 106A and the second suction port 106B of the oil pump P. The switch pressure solenoid 50 may be coupled to the pilot pressure oil path 90 and the second control pressure oil path 92. Opening a valve of the switch pressure solenoid 50 may cause a pressure that is supplied from the pilot pressure oil path 90 (i.e., a pilot pressure) to be supplied, as a switch hydraulic pressure, through the second control pressure oil path 92. The pilot pressure may be so supplied to the switch control valve 53 as to apply force at an end where the spring 532 of the spool 531 is not provided. In contrast, closing the valve of the switch pressure solenoid 50 may stop supplying the switch hydraulic pressure. At this occasion, the actuating oil in the second control pressure oil path 92 may be discharged, and thus, the switch hydraulic pressure may become zero.

Non-limiting examples of the switch pressure solenoid 50 may include an on-off solenoid. For example, application of a voltage may cause the on-off solenoid to open its valve. In contrast, stopping the application of the voltage may cause the on-off solenoid to close its valve. Alternatively, for example, the application of the voltage may cause the on-off solenoid to close its valve, whereas stopping the application of the voltage may cause the on-off solenoid to open its valve (i.e., normally open). The T/M-ECU 4B may control opening and closing of the valve of the switch pressure solenoid 50.

The control valve unit 54 may control a control pressure derived from an actuating oil to be used for shifting operation of the continuously variable transmission 3. The control pressure derived from the actuating oil may be a primary pressure and a secondary pressure. The control valve unit 54 may include a plurality of spool valves and at least one solenoid valve. The solenoid valve may be an electromagnetic valve that moves at least corresponding one of the plurality of spool valves. The control valve unit 54 may open and close the plurality of spool valves, to thereby adjust a line pressure derived from an actuating oil that is discharged from the oil pump P. The actuating oil having the line pressure that is adjusted in the control valve unit 54 may be supplied to each of the oil chamber 315 of the primary pulley 31 and the oil chamber 325 of the secondary pulley 32 in the continuously variable transmission 3. Further, the control valve unit 54 may supply the adjusted hydraulic pressure to other hydraulic pressure units. Non-limiting examples of the other hydraulic pressure units may include the forward reverse switching mechanism 20 that switches between a forward movement and a reverse movement of the vehicle 1. Non-limiting examples of the adjusted hydraulic pressure may include an actuating oil pressure and a lubricating oil pressure. In one implementation, the control valve unit 54 may serve as a "control pressure adjusting valve".

[Configuration of Abnormality Detector 6]

The abnormality detector 6 may detect an abnormality of the switch control valve 53. In an example implementation, the abnormality detector 6 may detect an abnormality of being fixed to half discharge state. The abnormality of being fixed to half discharge state may be, for example, an abnormality that occurs when the switch control valve 53 is not switched from the half discharge state to the full discharge state, and thus, fixed to the half discharge state. For example, the abnormality detector 6 may detect the abnormality of being fixed to half discharge state when a line pressure that is detected by a sensor is about the same as the maximum discharge pressure of the half discharge state, where the full discharge state is set by means of the switch control valve 53 during normal driving and a line pressure is so adjusted to be higher than a maximum discharge pressure of the half discharge state in the full discharge state. The sensor may include, for example, a pressure sensor provided in a sensor group 7.

[Configuration of Controller 4]

As illustrated in FIG. 1, the controller 4 may include the engine control unit (E/G-ECU) 4A, the transmission control unit (T/M-ECU) 4B, and a brake control unit (BRK-ECU) 4C. The E/G-ECU 4A, the T/M-ECU 4B, and the BRK-ECU 4C may be so coupled to one another as to perform communication mutually via a communication bus 19. Non-limiting examples of a communication network may include a controller area network (CAN) which is one of the standard protocols from the international Organization for Standardization (ISO). These units may configure a control system of the vehicle 1. Note that the coupling of the E/G-ECU 4A, the T/M-ECU 4B, and the BRK-ECU 4C is not limited to the configuration of the coupling with use of the communication bus 19. The coupling may be configured with use of, for example, wireless LAN.

The E/G-ECU 4A, the T/M-ECU 4B, and the BRK-ECU 4C may each include components including a microcontroller (e.g., a microprocessor), read-only memory (ROM), random access memory (RAM), backup RAM, and an input-output interface (I/F). The microcontroller may perform various arithmetic calculations. The ROM may store data such as programs that cause the microcontroller to execute various types of processing. The RAM may store various types of data such as arithmetic calculation results. The backup RAM may retain the stored data by means of, for example, a 12V battery.

In the controller 4, various types of information may be shared via the communication bus 19. The various types of information may include, for example, detection signals that are inputted from various types of switches and the sensor group 7 including various types of sensors to the E/G-ECU 4A, the T/M-ECU 4B, and the BRK-ECU 4C. The E/G-ECU 4A, for example, may output a control signal to components of the engine 2, to thereby control a factor such as engine output torque. The components of the engine 2 may include, for example, a throttle mechanism, a fuel injection mechanism, and an ignition mechanism. This may cause the E/G-ECU 4A to perform output control of the engine 2. Note that a so-called revolution limit (i.e., rev. limit) may be normally preset in the engine 2. The rev. limit refers to an upper limit value of a permitted revolution speed of the output shaft 2J. The E/G-ECU 4A may stop fuel from being supplied to a combustion chamber of the engine 2 when the revolution speed of the output shaft 2J in the engine 2 reaches a predetermined rev. limit. The E/G-ECU 4A may obtain the revolution speed of the output shaft 2J as a control variable of the engine 2 by means of an engine revolution number sensor provided in the sensor group 7, for example.

The T/M-ECU 4B may output a control signal to the hydraulic pressure circuit 5, to thereby adjust the actuating oil pressure in the hydraulic pressure circuit 5. Through the adjustment of this actuating oil pressure, the T/M-ECU 4B may perform a shifting control of the continuously variable transmission 3. Further, the T/M-ECU 4B may also request the E/G-ECU 4A to reduce engine output torque (i.e., torque down). Moreover, various types of information from various types of sensors provided in the sensor group 7 may be inputted to the T/M-ECU 4B. The various types of sensors may include, for example, the revolution number sensor of turbine, the revolution number sensor of primary pulley, and the revolution number sensor of secondary pulley. The T/M-ECU 4B may further include a target shifting ratio setting unit 4B1 and a solenoid valve controller 4B2. Both the target shifting ratio setting unit 4B1 and the solenoid valve controller 4B2 may be operated on the microcontroller. The target shifting ratio setting unit 4B1 may set a target shifting ratio of the continuously variable transmission 3. The target shifting ratio may be set on the basis of driving information of the vehicle 1. The driving information of the vehicle 1 may include, for example, a position of an accelerator pedal and the secondary pulley revolution number. The information relating to the position of the accelerator pedal may be sent from the E/G-ECU 4A. The information relating to the secondary pulley revolution number may be sent from the revolution number sensor of secondary pulley. The T/M-ECU 4B may so perform the shifting control as to cause an actual shifting ratio of the continuously variable transmission 3 to come close to a target shifting ratio that is set by the target shifting ratio setting unit 4B1. In an example implementation, the T/M-ECU 4B may adjust pressures in the control valve unit 54 on the basis of the control by the solenoid valve controller 4B2, to thereby cause the actual shifting ratio of the continuously variable transmission 3 to come close to the target shifting ratio that is set by the target shifting ratio setting unit 4B1. The pressures may include, for example, the line pressure, the primary pressure, and the secondary pressure, in the hydraulic pressure circuit 5.

The T/M-ECU 4B so controls the shifting operation of the continuously variable transmission 3 as to keep the revolution speed of the output shaft 2J at a value that is equal to or greater than an abnormal lower limit value, in an abnormal period in which the abnormality detector 6 detects the abnormality of being fixed to half discharge state. The abnormal lower limit value may be higher than a normal lower limit value in a normal period that is prior to a state in which the abnormality detector 6 detects the abnormality of being fixed to half discharge state. For example, the T/M-ECU 4B may set the shifting ratio in an abnormal period to be higher than the shifting ratio in the normal period. This setting performed by the T/M-ECU 4B makes it possible to cause the revolution speed of the output shaft 2J in the abnormal period to be higher than the revolution speed of the output shaft 2J in the normal period. At this occasion, together with this setting, the E/G-ECU 4A may so adjust a position of the throttle valve 2S as to adjust the revolution speed of the output shaft 2J coupled to the engine 2. As illustrated in FIG. 2, the throttle valve 2S may serve as an adjusting valve that adjusts an amount of air to be taken into the engine 2.

The T/M-ECU 4B may set the abnormal lower limit value in accordance with a requested hydraulic pressure that is requested by the hydraulic pressure unit provided in the continuously variable transmission 3. In other words, the T/M-ECU 4B may set a relatively high abnormal lower limit value if the requested hydraulic pressure from the continuously variable transmission 3 is relatively high. In contrast, the T/M-ECU 4B may set a relatively low abnormal lower limit value if the requested hydraulic pressure from the continuously variable transmission 3 is relatively low. At this occasion, the abnormal lower limit value may be set by considering factors including an oil temperature of the actuating oil and a running speed of the vehicle 1.

In an example implementation, the primary pulley 31 may revolve by an output from the engine 2, and the number of revolutions per unit time of the primary pulley 31 (i.e., a revolution speed of the primary pulley 31) may vary in accordance with a variation in the revolution speed of the output shaft 2J coupled to the engine 2. Therefore, the T/M-ECU 4B may so control the shifting operation of the continuously variable transmission 3 as to keep the revolution speed of the primary pulley 31 at a value that is equal to or greater than an abnormal rotation speed lower limit value that is higher than a normal rotation speed lower limit value in the normal period. Note that the secondary pulley 32 may revolve by revolution power that is fed from the primary pulley 31 by means of the chain 33.

The BRK-ECU 4C may further output a control signal to the valve unit 17, to thereby adjust a brake hydraulic pressure of a brake hydraulic system 16. The brake hydraulic system 16 may be provided with the valve unit 17. Through the adjustment of the brake hydraulic pressure, the BRK-ECU 4C may so control braking force of each of the brakes 18L and 18R as to avoid, for example, wheel lock-up upon braking, and tire slip upon accelerating or turning.

[Operation Performed by Continuously Variable Transmission 3 and Controller 4]

Figure 5:
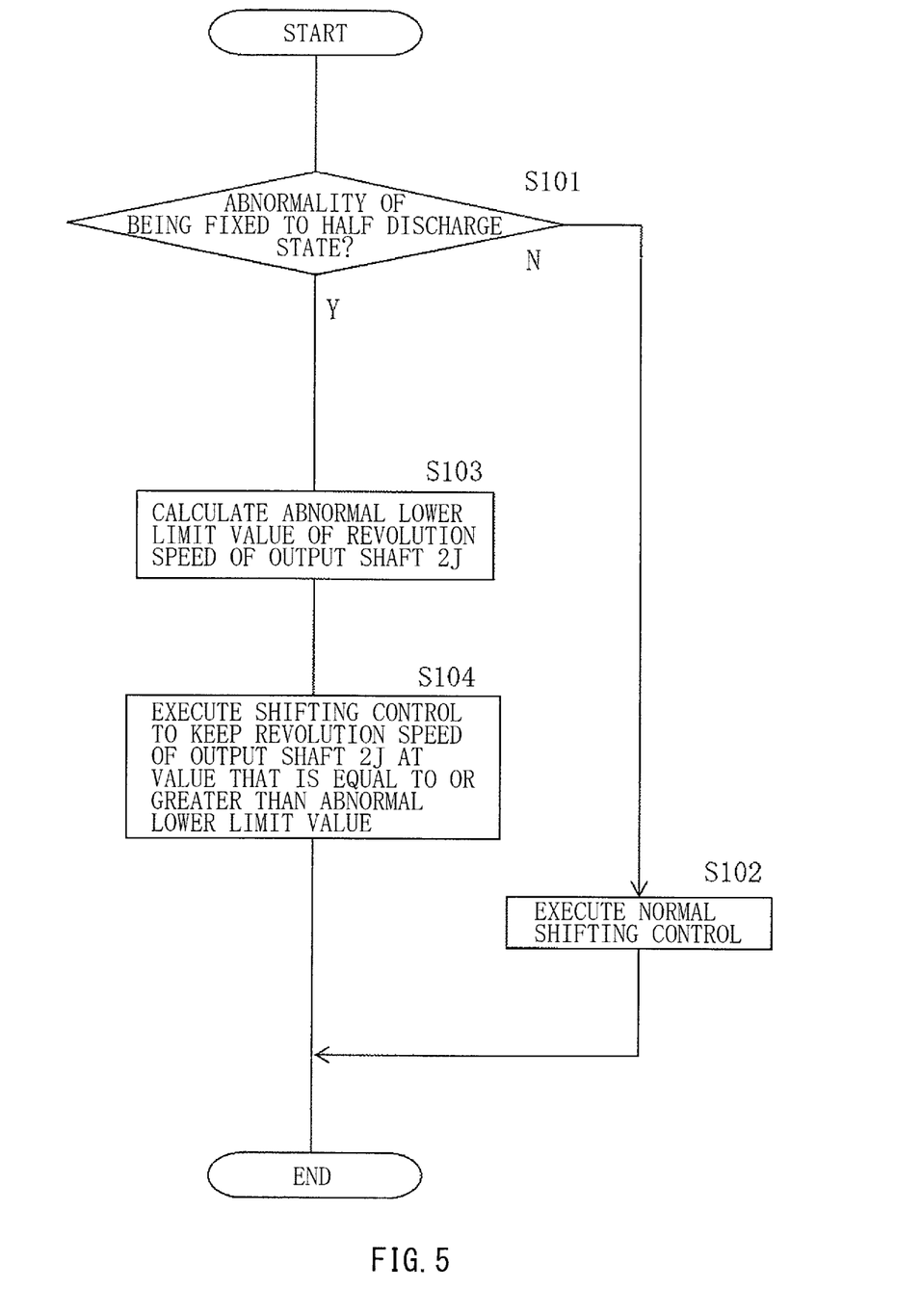
FIG. 5 is a flowchart illustrating an example of operation relating to an abnormality detection in the control apparatus of the continuously variable apparatus illustrated in FIG. 1.

Next, referring to FIG. 5, a description is given of an example of operation relating to an abnormality detection in the continuously variable transmission 3 and the controller 4. FIG. 5 is a flowchart illustrating an example of operation relating to an abnormality detection in the continuously variable transmission 3 and the controller 4. A sequence of the operation illustrated in FIG. 4 may be repetitively performed for each predetermined time in the continuously variable transmission 3 and the controller 4.

First, in step S101, a determination may be made by the abnormality detector 6 as to whether an abnormality in a discharge rate of an actuating oil flowing from the oil pump P occurs. The oil pump P may be a hydraulic pressure supply source. In step S101, the determination as to whether the abnormality of the oil pump P occurs may be made on the basis of a difference between a command value supplied from the T/M-ECU 4B and a value of an actual line pressure detected by a sensor including a pressure sensor provided in the sensor group 7.

When the abnormality is undetected in step S101 (N in step S101), a normal shifting control may be executed for the continuously variable transmission 3 in step S102. The normal shifting control executed in step S102 may be performed on the basis of the control by the solenoid valve controller 4B2 through the hydraulic pressure circuit 5. Thereafter, the sequence of the operation may end.

In contrast, when an abnormality is detected in step S101 (Y in step S101), the T/M-ECU 4B may calculate, in step S103, an abnormal lower limit value of a revolution speed of the output shaft 2J coupled to the engine 2. At this occasion in step S103, the T/M-ECU 4B may set the abnormal lower limit value in accordance with a requested hydraulic pressure that is requested by the hydraulic pressure unit provided in the continuously variable transmission 3. The abnormal lower limit value may be set by considering factors including the oil temperature of the actuating oil and a running speed of the vehicle 1. After the step S103, the shifting operation of the continuously variable transmission 3 may be so controlled, in step S104, as to keep the revolution speed of the output shaft 2J at a value that is equal to or greater than the abnormal lower limit value. Thereafter, the sequence of the operation may end. In step S104, for example, a shifting ratio may be set higher than a shifting ratio in the normal period. In step S104, a position of the throttle valve 2S illustrated in FIG. 2 may also be adjusted on the basis of the control by the E/G-ECU 4A, to thereby adjust an amount of air that is taken into the engine 2. Through the adjustment of the amount of the air, in step S104, the revolution speed of the output shaft 2J coupled to the engine 2 may be adjusted.

[Workings and Effects]

In an example implementation as described above, the controller 4, in an abnormal period, calculates an abnormal lower limit value of the revolution speed of the output shaft 2J coupled to the engine 2, and so controls the shifting operation of the continuously variable transmission 3 as to keep the revolution speed of the output shaft 2J at a value that is equal to or greater than the abnormal lower limit value. The abnormal period is a period in which an abnormality of being fixed to half discharge state of the switch control valve 53 is detected by the abnormality detector 6. Therefore, even when an error of being partially fixed (e.g., the abnormality of being fixed to half discharge state) occurs, the reduction of hydraulic pressure is mitigated, and thereby, a discharge rate that makes it possible to ensure a sufficient requested hydraulic pressure is obtained even in the partial discharge state (e.g., the half discharge state).

Figure 6:
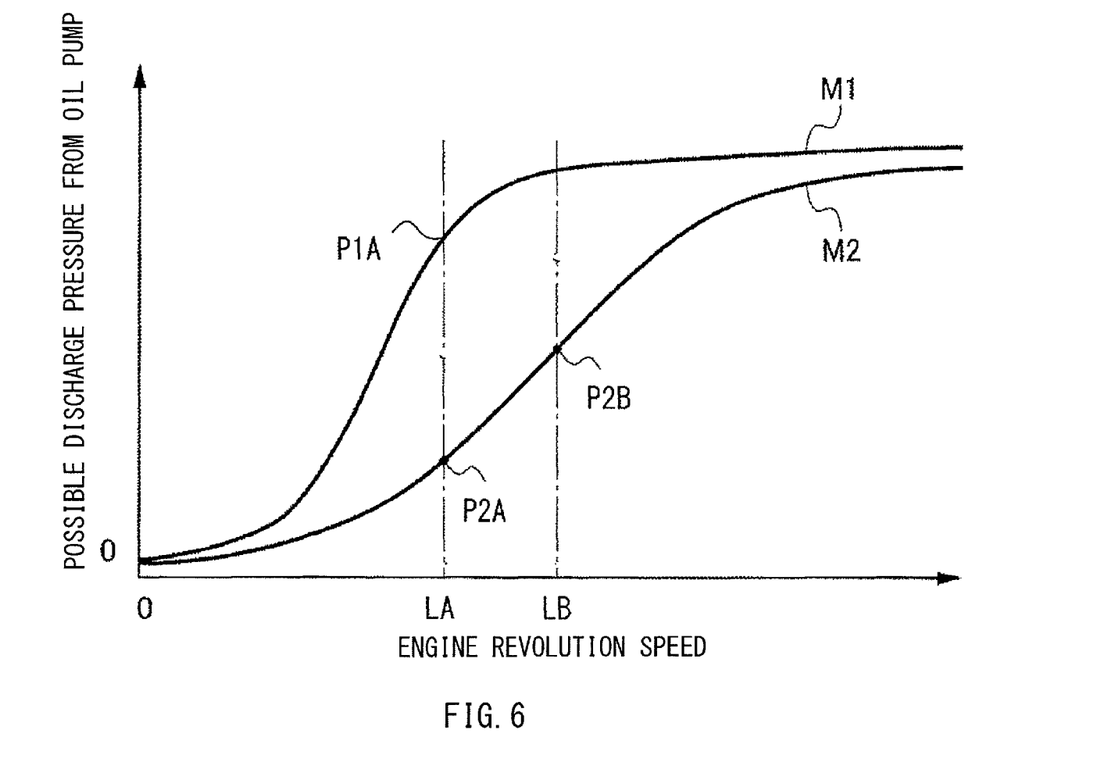
FIG. 6 is a diagram illustrating an example of characteristics of a relationship between a line pressure in the hydraulic pressure circuit and a revolution speed of an output shaft of an engine.

In the hydraulic pressure circuit 5 in an example implementation described above, a possible discharge pressure from the oil pump P may monotonously increase as the revolution speed of the output shaft 2J coupled to the engine 2 increases in any of the full discharge state and the half discharge state, as illustrated in FIG. 6, for example. Hereinafter, the possible discharge pressure from the oil pump P is simply referred to as "possible discharge pressure". FIG. 6 illustrates an example of characteristics of how the possible discharge pressure in the hydraulic pressure circuit 5 depends on the revolution speed of the output shaft 2J. FIG. 6 illustrates a revolution speed of the output shaft 2J on the horizontal axis, and a possible discharge pressure in the hydraulic pressure circuit 5 on the vertical axis. In FIG. 6, a curved line M1 represents the possible discharge pressure in the full discharge state, and a curved line M2 represents the possible discharge pressure in the half discharge state. In a normal period, the revolution speed of the output shaft 2J may be lowered to a normal lower limit LA in the hydraulic pressure circuit 5. At this occasion in the normal period, the T/M-ECU 4B may select the half discharge state when a requested hydraulic pressure from a hydraulic pressure unit is low. The hydraulic pressure unit may include, for example, the continuously variable transmission 3. When the half discharge state is selected, a possible discharge pressure P2A may be obtained, as illustrated in FIG. 6. However, when the requested hydraulic pressure from the hydraulic pressure unit temporarily increases, and thereby the possible discharge pressure P2A is insufficient to satisfy the requested hydraulic pressure, the T/M-ECU 4B may switch from the half discharge state to the full discharge state. This switching allows a possible discharge pressure P1A, which is higher than the possible discharge pressure to be obtained. However, when the abnormality of being fixed to half discharge state of the switch control valve 53 occurs, the possible discharge pressure P2A may possibly remain at the same level unless the revolution speed of the output shaft 2J varies. This may possibly prevent the requested hydraulic pressure from being satisfied. However, in an example implementation described above, an abnormal lower limit value LB, which is higher than the normal lower limit value LA, may be so set as to increase the revolution speed of the output shaft 2J. Therefore, it is possible to obtain a possible discharge pressure P2B, which is higher than the possible discharge pressure P2A, even when the abnormality of being fixed to half discharge state of the switch control valve 53. The abnormal lower limit value LB may be so set as to allow a sufficient possible discharge pressure P29 to be obtained, in accordance with a requested hydraulic pressure.

According to the control apparatus of the continuously variable transmission 3 and the method of controlling the continuously variable transmission 3 in an example implementation described above, it is possible to smoothly perform desired shifting operation of the continuously variable transmission 3 even when an error of being partially fixed (e.g., an abnormality of being fixed to half discharge state) occurs. This leads to improvement of user convenience.

2. Modification Examples

Although the technology is described hereinabove with reference to the example implementations, the technology is not limited to the example implementations, and may be modified in wide variety of ways.

For example, an example implementation described above may be applied to a chain-type continuously variable transmission with use of the chain 33 or a belt-type continuously variable transmission with use of a belt. However, the technology is not limited the example implementation. For example, an example implementation of the technology may be applied to a toroidal-type continuously variable transmission or another type of continuously variable transmission.

Further, an example implementation described above is not limited to a control apparatus of a continuously variable transmission but may be applied to a multistep automatic transmission with a planetary gear transmission mechanism, for example. When an abnormality of the switcher in such a multistep automatic transmission occurs, the number of revolution of an input shaft may be kept higher than the number of revolution of the input shaft in a normal period. Alternatively, a step having a higher shifting ratio than a shifting ratio in the normal period may be selected. The step having a higher shifting ratio may be, for example, a speed step on a low-side that is lower than a speed step in the normal period. Such control of the shifting operation makes it possible to keep a revolution speed of an engine at a value that is equal to or greater than an abnormal lower limit value that is higher than a normal lower limit value. Hence, it is possible to smoothly perform desired shifting operation of the multistep transmission.

Further, the E/G-ECU 4A and the T/M-ECU 4B in an example implementation described above may be each configured by discrete hardware, or may be configured by integrated hardware.

Further, in an example implementation described above, some solenoid valves may be used. However, for the hydraulic pressure circuit in an alternative example implementation, a device such as a stepping motor may be used in place of the solenoid valve. Further, an oil path system of the hydraulic pressure circuit in an example implementation described above is not limited to the hydraulic pressure circuit 5 illustrated in FIG. 4 according to an example implementation described above. An alternative oil path system may be used.

Further, the primary pulley 31 and the secondary pulley 32 are exemplified as the hydraulic pressure units in an example implementation described above and a modification example described above. However, the hydraulic pressure units according to an example implementation described above is not limitative. The hydraulic pressure units may encompass any other device, such as a clutch circuit, as well.

Further, the sequence of the operation in an example implementation described above and a modification example described above may be performed by hardware (e.g., circuitry) or software (e.g., a program). In a case where the sequence of the operation is performed by software, the software may include a group of programs that causes a computer to execute each pieces of processing. Each of the programs may be incorporated into the computer in advance, or may be installed in the computer via a network or a storage medium.

Further, in an example implementation described above, the actuating oil may be discharged from both the first discharge port 107A and the second discharge port 107B in the full discharge state. The resultant actuating oil may be supplied to the continuously variable transmission 3. Further, only the actuating oil may be discharged from the first discharge port 107A in the half discharge state (e.g., the partial discharge state). Only the resultant actuating oil discharged from the first discharge port 107A may also be supplied to the continuously variable transmission 3. However, the discharge states in an example implementation described above is not limitative. An alternative example of switching may be performed between the full discharge state and the partial discharge state. In an alternative example implementation, the full discharge state may be a state in which an actuating oil discharged from all of three or more discharge ports is supplied to the continuously variable transmission 3. The partial discharge state may be a state in which an actuating oil discharged from one or more of the three or more discharge ports is supplied to the continuously variable transmission 3.

Note that the effects described in an example implementation of the technology are merely exemplary effects, and thus not limited thereto. There may be another effects.

The controller 4 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 4 illustrated in FIG. 1.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control apparatus of a transmission, the transmission including a hydraulic pressure unit and being configured to perform shifting operation with use of a control pressure derived from an actuating oil that is to be supplied to the hydraulic pressure unit, the control apparatus being configured to control the transmission, the control apparatus comprising:
a hydraulic pressure supply source including a plurality of discharge ports that are configured to discharge the actuating oil, the hydraulic pressure supply source having a discharge rate of the actuating oil discharged from the plurality of discharge ports, the discharge rate varying in accordance with a variation in a revolution speed of an engine that is coupled to the transmission;
a switch control valve configured to switch between a full discharge state and a partial discharge state, the full discharge state being a state in which the actuating oil that is discharged from all of the plurality of discharge ports is supplied to the hydraulic pressure unit, the partial discharge state being a state in which only the actuating oil that is discharged from one or more of the plurality of discharge ports is supplied to the hydraulic pressure unit;
a control pressure adjusting valve configured to adjust the control pressure that is derived from the actuating oil and that is to be applied to the hydraulic pressure unit;
an abnormality detector configured to detect an abnormality of the switch control valve; and
a processor configured to control the shifting operation of the transmission to keep the revolution speed of the engine, in an abnormal period in which the abnormality of the switch control valve is detected by the abnormality detector, at a value that is equal to or greater than an abnormal lower limit value, the abnormal lower limit value being higher than a normal lower limit value in a normal period, the normal period being prior to the detection of the abnormality of the switch control valve by the abnormality detector.

2. The control apparatus of the transmission according to claim 1, wherein the processor causes a shifting ratio in the abnormal period to be higher than a shifting ratio in the normal period.

3. The control apparatus of the transmission according to claim 2, wherein
the hydraulic pressure unit comprises a plurality of hydraulic pressure units,
the transmission further includes, as the plurality of hydraulic pressure units, a primary pulley and a secondary pulley, and further includes a power feeding member,
the primary pulley is configured to rotate by an output derived from the engine, and a rotation speed of the primary pulley varies in accordance with the variation in the revolution speed of the engine,
the secondary pulley is configured to rotate by rotation power that is fed from the primary pulley by means of the power feeding member, and
the processor controls the shifting operation of the transmission to keep the rotation speed of the primary pulley at a value that is equal to or greater than an abnormal rotation speed lower limit value, the abnormal rotation speed lower limit being higher than a normal rotation speed lower limit value in the normal period.

4. The control apparatus of the transmission according to claim 1, wherein the processor adjusts the revolution speed of the engine by adjusting a position of an adjusting valve that is configured to adjust an amount of air that is to be taken into the engine.

5. The control apparatus of the transmission according to claim 2, wherein the processor adjusts the revolution speed of the engine by adjusting a position of an adjusting valve that is configured to adjust an amount of air that is to be taken into the engine.

6. The control apparatus of the transmission according to claim 3, wherein the processor adjusts the revolution speed of the engine by adjusting a position of an adjusting valve that is configured to adjust an amount of air that is to be taken into the engine.

7. The control apparatus of the transmission according to claim 1, wherein the processor sets the abnormal lower limit value in accordance with a requested hydraulic pressure that is requested by the hydraulic pressure unit.

8. The control apparatus of the transmission according to claim 2, wherein the processor sets the abnormal lower limit value in accordance with a requested hydraulic pressure that is requested by the hydraulic pressure unit.

9. The control apparatus of the transmission according to claim 3, wherein the processor sets the abnormal lower limit value in accordance with a requested hydraulic pressure that is requested by the hydraulic pressure unit.

10. The control apparatus of the transmission according to claim 4, wherein the processor sets the abnormal lower limit value in accordance with a requested hydraulic pressure that is requested by the hydraulic pressure unit.

11. The control apparatus of the transmission according to claim 5, wherein the processor sets the abnormal lower limit value in accordance with a requested hydraulic pressure that is requested by the hydraulic pressure unit.

12. The control apparatus of the transmission according to claim 6, wherein the processor sets the abnormal lower limit value in accordance with a requested hydraulic pressure that is requested by the hydraulic pressure unit.

13. The control apparatus of the transmission according to claim 1, wherein the abnormality detector detects, as the abnormality of the switch control valve, an abnormality of being fixed to the partial discharge state.

14. The control apparatus of the transmission according to claim 2, wherein the abnormality detector detects, as the abnormality of the switch control valve, an abnormality of being fixed to the partial discharge state.

15. The control apparatus of the transmission according to claim 3, wherein the abnormality detector detects, as the abnormality of the switch control valve, an abnormality of being fixed to the partial discharge state.

16. The control apparatus of the transmission according to claim 4, wherein the abnormality detector detects, as the abnormality of the switch control valve, an abnormality of being fixed to the partial discharge state.

17. The control apparatus of the transmission according to claim 5, wherein the abnormality detector detects, as the abnormality of the switch control valve, an abnormality of being fixed to the partial discharge state.

18. The control apparatus of the transmission according to claim 6, wherein the abnormality detector detects, as the abnormality of the switch control valve, an abnormality of being fixed to the partial discharge state.

19. A method of controlling a transmission, the transmission including a hydraulic pressure unit and being configured to perform shifting operation with use of a control pressure derived from an actuating oil that is to be supplied to the hydraulic pressure unit, the method comprising:

switching between a full discharge state and a partial discharge state in a hydraulic pressure supply source, the hydraulic pressure supply source including a plurality of discharge ports that are configured to discharge the actuating oil and having a discharge rate of the actuating oil that is discharged from the plurality of discharge ports, the discharge rate varying in accordance with a variation in a revolution speed of an engine that is coupled to the transmission, the full discharge state being a state in which the actuating oil that is discharged from all of the plurality of discharge ports is supplied to the hydraulic pressure unit, the partial discharge state being a state in which only the actuating oil that is discharged from one or more of the plurality of discharge ports is supplied to the hydraulic pressure unit;

adjusting the control pressure that is derived from the actuating oil and that is to be applied to the hydraulic pressure unit;

detecting an abnormality of the switching; and controlling the shifting operation of the transmission to keep the revolution speed of the engine, in an abnormal period in which the abnormality of the switching is detected, at a value that is equal to or greater than an abnormal lower limit value, the abnormal lower limit value being higher than a normal lower limit value in a normal period, the normal period being prior to the detection of the abnormality of the switching.

* * * * *